United States Patent [19]

Koyanagi

[11] Patent Number: 4,558,679
[45] Date of Patent: Dec. 17, 1985

[54] METHOD OF CONTROLLING HYDRAULIC ACTUATOR

[75] Inventor: Yuzo Koyanagi, Warabi, Japan

[73] Assignee: Sanwa Seiki Mfg., Co., Ltd., Yono, Japan

[21] Appl. No.: 317,602

[22] Filed: Nov. 3, 1981

[30] Foreign Application Priority Data

Nov. 7, 1980 [JP] Japan .................................. 55-155771
Nov. 26, 1980 [JP] Japan .................................. 55-166200
Sep. 25, 1981 [JP] Japan .................................. 56-151614

[51] Int. Cl.$^4$ ............................................. F02M 59/20
[52] U.S. Cl. ..................................... 123/502; 123/357; 73/119 A
[58] Field of Search ............... 123/500, 501, 502, 357, 123/358, 359; 73/119 A

[56] References Cited

U.S. PATENT DOCUMENTS 4,265,200 5/1981 Wessel .................................. 123/501
4,355,621 10/1982 Yasuhara ............................. 123/500
4,368,705 1/1983 Stevenson .......................... 123/501
4,395,905 8/1983 Fujimori ............................. 123/502

Primary Examiner—Carl Stuart Miller
Attorney, Agent, or Firm—Bert J. Lewen; Henry Sternberg

[57] ABSTRACT

A method of controlling a hydraulic actuator which controls the rotational phase angle of the fuel injection pump for the automobile. A satisfactory exhaust gas composition and an appropriate fuel consumption during a warm-up period of the engine are achieved when the oil temperature in the hydraulic actuator is low. The control method for the hydraulic actuator includes the steps of detecting the temperature corresponding to the oil temperature, comparing the detected temperature with the predetermined reference temperature, and making the application period of the command pulse signal for driving the hydraulic actuator longer than the predetermined length when the detected temperature is lower than the predetermined reference temperature.

6 Claims, 10 Drawing Figures

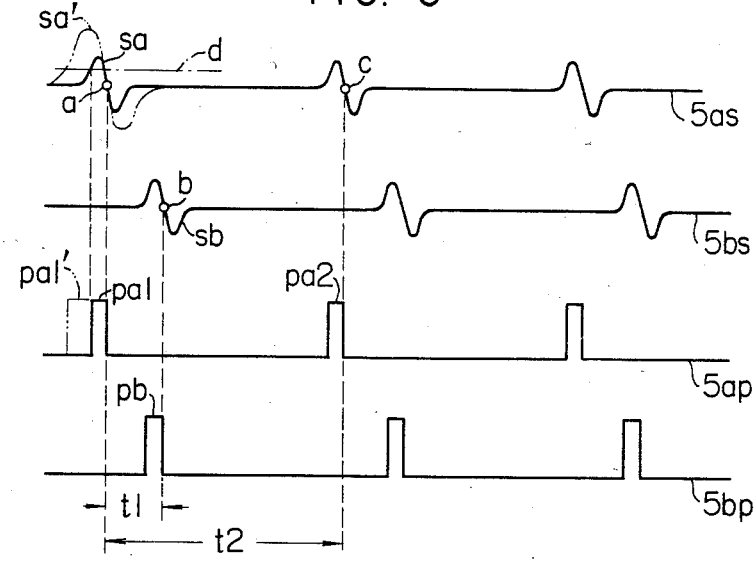
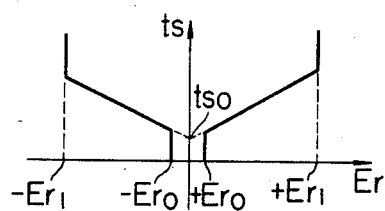
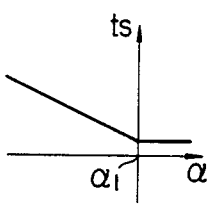
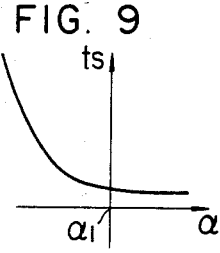
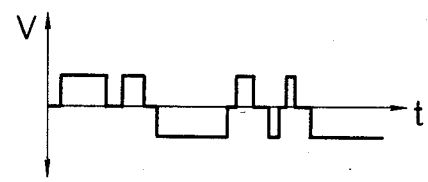

4,558,679

METHOD OF CONTROLLING HYDRAULIC ACTUATOR

The present invention relates to a method of controlling a digital actuator, particularly to a method of controlling a hydraulic actuator which controls, for example, the rotational phase angle of the fuel injection pump for the automobile.

In the control system including hydraulic control system, a fall in the hydraulic oil temperature causes an increase in the viscosity and specific gravity of the oil, resulting in a deterioration of the response of the whole control system. Therefore, the hydraulic system is generally equipped with an oil temperature controller or operated in a stabilized temperature environment. However, the problem is not solved for a system which is difficult to have such oil temperature controller e.g., for a small transportable system, when used in winter.

Particularly, in operating a fuel injection timing regulator of the automobile including hydraulic control system in winter when the oil temperature is low, the hydraulic system must be handled appropriately after the engine has started in order to prevent problems such as emission of harmful exhaust gas and increased fuel consumption during the warm-up period.

Accordingly, it is an object of the present invention to provide a method of controlling a hydraulic actuator which is rid of the problems caused by cold hydraulic coil.

According to the present invention there is provided a method of controlling a hydraulic actuator in a hydraulic control system in which the deviation between the command value or the command value indicated following the first-mentioned command value and the resultant controlled output is minimized in use of a digital pulse signal, comprising the step of detecting by a computer which controls the hydraulic actuator an oil temperature of the hydraulic system and increasing the duration of the digital signal when the detected oil temperature is below the predetermined temperature.

These and other objects, features and advantages of the present invention will be more apparent from the following description taken in conjunction with the accompanying drawings, in which:

FIG. 6 is a set of waveform charts showing from the top to the bottom signals 5as and 5bs detected by the electromagnetic pickups 5G and 5H, and the corresponding output signals from the Schmitt circuit 5AB in FIG. 2 which transforms the signal from each pickup to a rectangular signal;

FIG. 7 is a characteristic diagram showing the pulse duration ts vs. the deviation Er relationship of the control command signal sent out over line 5k in FIG. 1 in the normal state of control;

FIGS. 8 and 9 are plots each showing the pulse duration ts vs. the air temperature relationship; and FIG. 10 is a time chart showing the characteristic of the command signal v which appears on line 5k in FIG. 1.

Figure 1:
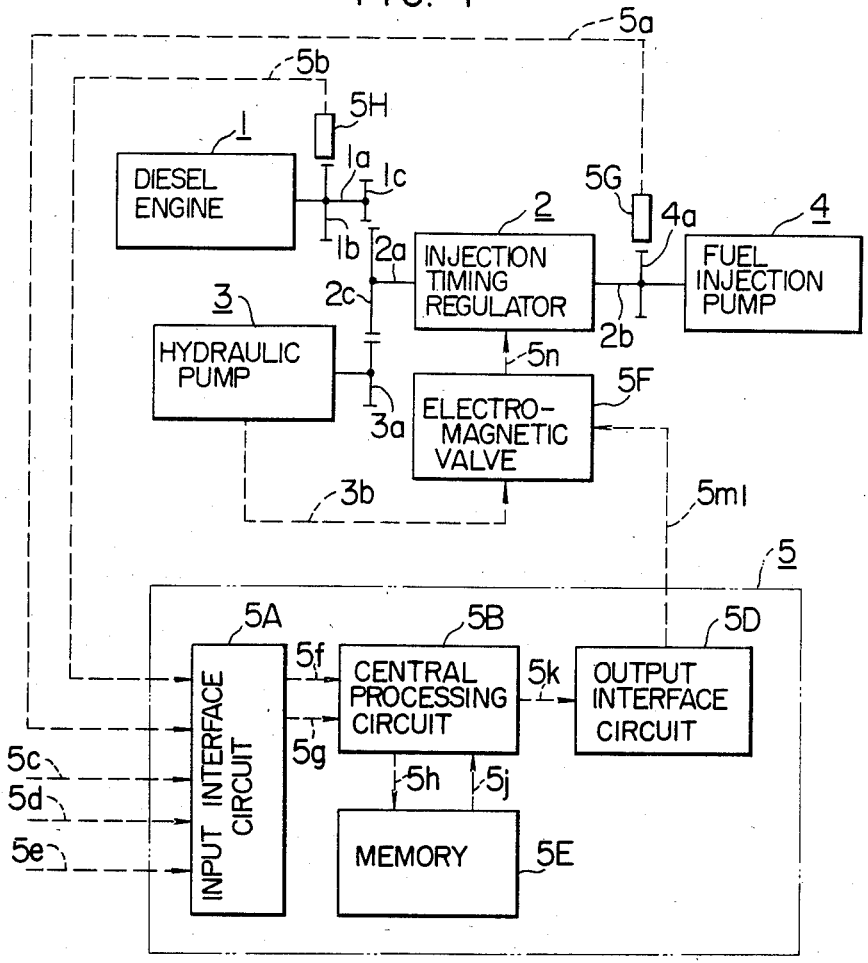
FIG. 1 is a systematic diagram of the method of controlling a hydraulic actuator according to the present invention applied to the fuel injection timing regulator for the diesel engine.

The invention will now be described by way of emodiment. FIG. 1 is a systematic diagram of the method of controlling a hydraulic actuator embodying the present invention applied to the operation of an injection timing regulator 2 of a fuel injection pump 4 for a diesel engine 1. The hydraulic actuator is incorporated within the injection timing regulator 2. A pinion 1c provided on a crank shaft 1a of the diesel engine 1 is in the engagement to a gear 2c provided on an input shaft 2a of the injection timing regulator 2, and an output shaft 2b of the injection timing regulator 2 is adapted to drive the fuel injection pump 4. The injection timing regulator 2 varies the rotational phase angle between the input shaft 2a and the output shaft 2b in response to the operational condition of the diesel engine 1, so as to appropriately adjusting the injection timing for the fuel injection pump 4. The injection timing regulator 2 per se is known in the art.

A hydraulic pump 3 is driven through the gears 2c and 3a to supply a constant pressure to an electromagnetic valve 5F through a piping 3b.

The crank shaft 1a has at its end a disk 1b, and the output shaft 2b also has a similar disk 4a with circumference thereof provided with a train of bosses disposed at a constant interval. Confronting the circumference of the disks 1b and 4a, there are fixedly provided electromagnetic pickups 5H and 5G, respectively, for detecting the rotation of the disks. Reference numbers 5a and 5b denote signal lines.

A signal line 5c transmits the displacement of the acceleration pedal for operating the diesel engine 1 to an input interface circuit 5A, a signal line 5d transmits the signal of the coolant temperature in the water jacket of the diesel engine 1 to the input interface circuit 5A, and a signal line 5e transmits the signal of the air temperature to the input interface circuit 5A. The air temperature is detected by a thermal sensor such as a thermistor or thermocouple mounted on the exterior wall of a computer 5.

The input interface circuit 5A, a central processing circuit 5B, a memory 5E and an output interface circuit 5D constitute a microcomputer 5. A signal line 5k is made up of one signal line 5k1 shown in FIG. 3 and another signal line 5k2 which is not shown in the figure. The output of the microcomputer 5 is adapted to control the electromagnetic valve 5F through a signal line 5m, and the valve 5F operates the hydraulic actuator within the injection timing regulator 2 through a hydraulic pipe 5n.

Figure 2:
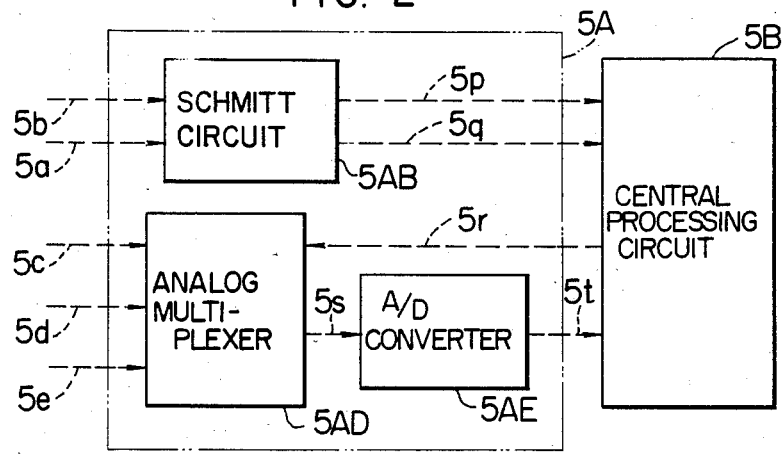
FIG. 2 is a block diagram of the input interface circuit 5A shown in FIG. 1.

The input interface circuit 5A consists of a Schmitt circuit 5AB, an analog multiplexer 5AD and an A/D converter 5AE as shown in FIG. 2, where reference numbers 5p, 5q, 5r 5s, and 5t denote signal lines.

Figure 3:
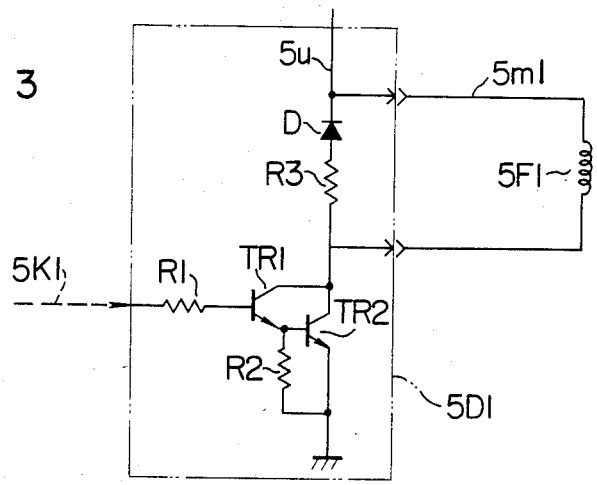
FIG. 3 is a circuit diagram of one (5D1) of the output interface circuits 5D shown in FIG. 1.

FIG. 3 shows an output interface circuit 5D1 which is one of circuits included in the output interface circuit 5D, where a resistor R1 has one end connected with the signal line 5k1 from the central processing circuit 5B. The signal line 5ml is connected to a solenoid 5F1 of the electromagnetic valve 5F in FIG. 1, and a line 5u is connected to a constant voltage source. The output interface circuit 5D1 further includes a fly-wheel diode D, resistors R2 and R3, and transistors TR1 and TR2. Another output interface circuit having another input line 5k2 has the same circuit arrangement as that of FIG. 3, and the explanation thereof will be omitted.

The operation of the system arrangement shown in FIGS. 1, 2 and 3 will now be described in the following. The diesel engine 1 operates in response to the displacement of the acceleration pedal (not shown in the figure). The fuel injection pump 4 is driven through the crank shaft 1a, the gears 1c and 2c, the input shaft 2a, the injection timing regulator 2, and its output shaft 2b. The injection timing regulator 2 is controlled depending on the rotational speed of the diesel engine 1, the displacement of the accelerator pedal, the temperature of the coolant in the water jacket (hereinafter will be called simply the coolant temperature), and the state of the air. Through that control, the hydraulic actuator within the injection timing regulator 2 is operated in one direction or another by the hydraulic signals (control power) through the pipes 5n. Consequently, the injection timing regulator 2 varies the relative rotational phase angle between the input shaft 2a (i.e., the rotational angle of the crank shaft 1a) and the output shaft 2b, so as to appropriately determine the timing of the activation of the fuel injection pump 4.

In determining the timing of injection, the microcomputer 5 outputs a command signal to switch the electromagnetic valve 5F in one direction or another, and a powered hydraulic signal from the valve 5F operates the injection timing regulator 2. The operation of the microcomputer 5 which controls the electromagnetic valve 5F, i.e., a digital actuator, is described hereunder.

The displacement of the accelerator pedal, the coolant temperature and the air temperature are sensed in analog values by respective sensors (not shown in the figure), and the sensed signals are subjected to the cyclic selection by an analog multiplexer 5AD in response to the signal from the central processing circuit 5B through a signal line 5r as shown in FIG. 2. The selected sensor signals in analog are transformed into digital values by an A/D converter 5AE, then delivered to the central processing circuit 5B.

The rotational angle of the crank shaft 1a and the output shaft 2b is detected by the electromagnetic pickups 5H and 5G, respectively, to form detection signals 5as and 5bs as shown in FIG. 6, and these signals are supplied to the Schmitt circuit 5AB in FIG. 2. The horizontal axis of the chart in FIG. 6 represents time.

Pulse signals sa and sb in FIG. 6 show the pickup voltages when a boss on each of the disks 1b and 4a passes over each of the electromagnetic pickups 5H and 5G, respectively.

These pulse signals sa and sb are transformed into rectangular pulse signals pa1 and pb, respectively, by the Schmitt circuit 5AB, then delivered to the central processing circuit 5B.

The pulse signals sa and sb vary their waveform as the rotational speed of the crank shaft 1a increases as shown by sa' in FIG. 6, causing the pulse signals pa1 and pb to vary as shown by pa1' since they are shaped basing on the reference voltage level d. However, zero crossing points a and b of the pulse signals sa and sb are scarcely affected by the rotational speed, and thus the duration of the pulse signals pa1 and pb is defined on the basis of the points a and b.

Time intervals t1 and t2 represent passing times measured from the pulse signal pa1 to pb, and from pa1 to pa2. The rotational phase angle $P\theta$ between the input shaft 2a and the output shaft 2b, and the rotational speed n of the crank shaft 1a are expressed as follows.

$$P\theta = (c1 \times t1)/t2 \quad (1)$$

$$n = c2/t2 \quad (2)$$

where c1 and c2 are the constants determined from the number of bosses on the disks 1b and 4a, respectively.

The memory 5E in FIG. 1 stores various data necessary for the computation by the central processing circuit 5B.

The system is designed so that the fuel consumption can be minimized or the composition of exhaust gas can be optimized for the diesel engine 1 when the fuel injection timing is set to the ideal point depending on the coolant temperature, the air temperature, the displacement $\theta$ of the accelerator pedal, and the rotational speed n of the crank shaft 1a. Out of these functional relations, the memory 5E stores reference rotational phase angles $p\theta o$ to be set to the injection timing regulator 2 in relation to the displacement $\theta$ of the accelerator pedal and the rotational speed n of the crank shaft 1a, for example, as shown by the memory map in FIG. 5.

Figure 5:
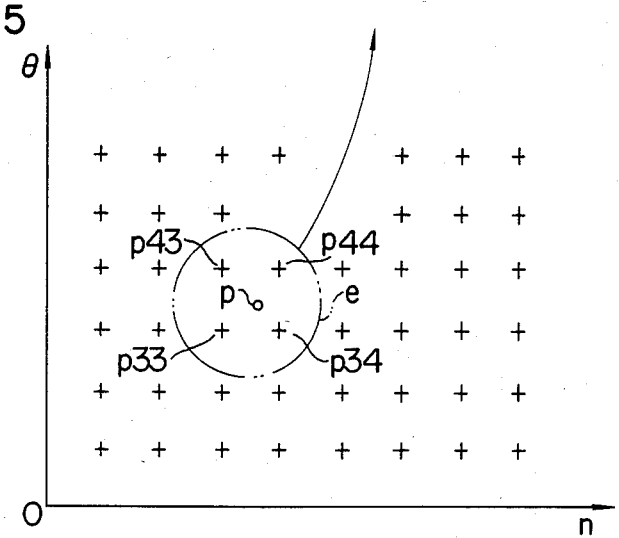
FIG. 5 is a plot showing in discrete values on a plane the command rotational phase angle of the fuel injection pump which is determined depending on the accelerator pedal position $\theta$ and the engine speed n.

In FIG. 5, each of marks "+" such as p33, p34, p43 and p44 represents a reference rotational phase angle stored in correspondence to a pair of discrete values of the accelerator displacement $\theta$ and the crank shaft speed n taken at a constant interval, and several memory maps are stored for different coolant temperature and air temperature.

In FIG. 5, the reference rotational phase angle $p\theta o$ at the actual operating point p, which is determined from the rotational speed n derived from the electromagnetic pickup 5H and the accelerator displacement $\theta$ at that time, is determined by reference rotational phase angles p33, p34, p43 and p44 in the neighborhood e of the point p.

Figure 4:
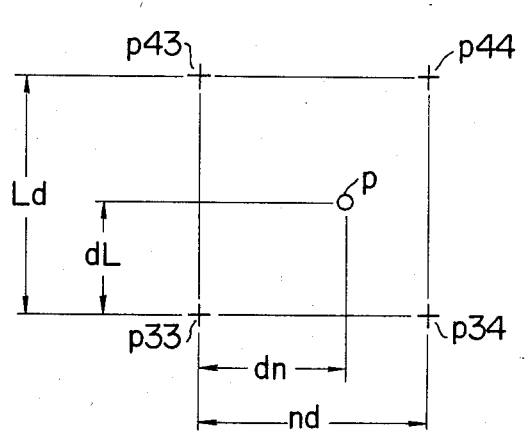
FIG. 4 is a partial magnified view in the neighborhood e of the plot shown in FIG. 5.

FIG. 4 shows in detail the neighborhood e of the operating point p, where distances Ld and dL represent the difference of displacement of the accelerator pedal, and distances nd and dn represent the difference of rotational speed. The reference rotational phase angle $p\theta o$ at the point p is computed by the central processing circuit 5B in the following equations.

$$p\theta o = \{(A-B)dn/nd\} + B \quad (3)$$

where $$A = \{(p44-p34)dL/Ld\} + p34 \quad (4)$$

$$B = \{(p43-p33)dL/Ld\} + p33 \quad (5)$$

All of the equations (1) through (5) are stored in the memory 5E.

The actual rotational phase angle pe obtained by the equation (1) is compared with the reference rotational phase angle $p\theta o$ obtained by the equation (3). In the normal condition, the comparison is followed by the following computation by use of the characteristic shown in FIG. 7, then a command signal is sent out over the line 5k in FIG. 1.

Computation 1: Compute the deviation, $Er = p\theta o - p - 74$
Computation 2: Compare the absolute value of the deviation Er with the absolute values of the minimum reference deviation Ero and the maximum reference deviation Erl stored in the memory 5E.

Computation 3: If the absolute value of the deviation Er is smaller than the absolute value of the minimum reference deviation Ero, bring the command signal to 0 volt.

Computation 4: If the absolute value of the deviation Er is larger than the absolute value of the minimum reference deviation Ero and smaller than the maximum reference deviation Er1, determine the polarity of the deviation Er by the central processing circuit 5E. If the deviation Er is possitive, one command signal is sent out over the line 5k1, or if the deviation Er is negative, another command signal is sent out over the line 5k2, so that the deviation Er is minimized.

In this case, the pulse width of each command signal has a duration which is in proportion to the deviation Er and added by the minimum application period tso in FIG. 7. The duration ts of the output command signal is stored in the memory 5E of the microcomputer 5 so that it is used as the base of the command signal which will be outputted in the subsequent correction of deviation.

Computation 4-1: If the absolute value of the deviation Er resides continuously in the state of computation 4 or regains the state after it has once entered the reference range, the application period ts of the command signal stored in the memory 5E in the previous computation 4 is replaced with tsp to form a basic application period. When the deviation Er still has the same polarity as that of the deviation detected previously and does not reach the range from −Ero to +Ero in FIG. 7, the application period tsa of a new command signal is computed by:

$$tsa = tsp + (C3 \times tsc) \quad (6)$$

where C3 is the constant and tsc is the value which is proportional to the absolute value of the current deviation Er.

Or, if the deviation Er has changed the polarity from that of the previously detected deviation Er due to the effect of the previous command signal and is out of the range from −Ero to +Ero, i.e., this means an overshooting of control caused by the previous command signal, the application time tsa for the new command signal is computed by:

$$tsa = tsp - (C4 \times tsc) \quad (7)$$

where C4 is the constant and tsc is a value which is proportional to the absolute value of the current deviation Er.

The computation of the current application period tsa carried out by the equations (6) and (7) has the following meaning.

If the previous correction of deviation is not followed by the result of control in the range from −Ero to +Ero (FIG. 7), it means that the action of the previous command signal was too small (i.e., too short application period). By this reason, the application period tsa of the new command signal is formed by addition of a correcting term (c1×tso) to the previous application period tsp so that the sensitivity of control is increased. Conversely, if an overshooting has resulted from the previous correction of deviation, it means that the action of the previous command signal was too strong. In this case, the previous application period tsp is subtracted by the value of (c2×tso), as shown in the equation (7), to form a new application period tsa, so that the sensitivity of control is lowered. That is, setup of the application period by the equations (6) and (7) optimizes the sensitivity of control.

After the command signal obtained by the above computation 4-1 has been issued, the application period tsa at that time replaces the previous application period tsp in the memory 5E as a new basic application period, so that the computation 4-1 will be carried out in subsequent control for correcting the deviation when the deviation Er enters the range from −Er1 to −Ero or from +Ero to +Er1 in FIG. 7.

If the deviation Er becomes the state of computation 3 or computation 5 (will be described later), the basic application period tsp which has been stored most lately in the memory 5E will be used for the subsequent control for correction of deviation.

Computation 5: If the absolute value of the deviation Er is larger than the absolute value of the maximum reference deviation Er1, the command signal is sent out continuously over the line 5k1 or 5k2 until the deviation Er is corrected by the command signal down to the state of computation 4-1.

FIG. 10 shows a series of command signals obtained as a result of the foregoing computation.

It should be noted in FIG. 10 that the upper pulses are sent out over the line 5k1, and the lower pulses are sent out over the line 5k2.

In FIG. 7, the vertical axis ts represents the application period of the offset command signal, and the horizontal axis Er represents the deviation. The characteristic on the right of the ts axis shows the application period of the command signal supplied to the line 5k1 in FIG. 3, and the characteristic on the left of the ts axis shows the application period of the signal supplied to another line 5k2 as mentioned above but not shown in the figure. Point tso indicates the intersection of the ts axis and the lines with the slope (solid line) of each characteristic.

In the above description with reference to FIG. 3, the signal line 5k in FIG. 1 consists of lines 5k1 and 5k2. However, the arrangement may be made such that one command signal in a positive voltage and another command signal in a negative voltage are sent out over a single signal line 5k with its one end connected to the output interface circuit 5D1, and with another end connected through a polarity inverter to another output interface circuit 5D2 (identical to the circuit 5D1).

The foregoing embodiment is a digital control which is performed in the normal condition, and the following consideration is taken for the control operation when the air temperature is low in winter.

When the hydraulic oil in the hydraulic pump 3 is very cold due to, for example, a cold service region, the viscosity and the specific gravity of the oil are high as mentioned previously, resulting in a dull response in the hydraulic control system including the pipe 3b, electromagnetic valve 5F, pipe 6n and injection timing regulator (hydraulic actuator)2.

In addition, immediately after the switch for initiating control has been turned on, state of the loaded hydraulic actuator is indeterminate due to the negative feedback control system. Therefore, there is often a large deviation Er between the command rotational phase angle pθo as a result of the foregoing computation and the actual rotational phase angle pθ in the initial state.

This is a serious problem for a system which needs a quick establishment of control in the initial state, and it is requested to solve the dull response in the cold oil temperature as mentioned above. In the case of the hydraulic system used in the automobile which is an embodiment of the present invention, during the warm-up operation following the start of the engine, a dull response of the hydraulic system causes a failure of injection timing of the fuel injection pump, resulting in an undesirable exhaust gas composition and also a poor fuel efficiency.

In order to cope with such problems, according to the present invention, the following steps of computation are carried out at the beginning of control with the relation between the application period ts of the command signal and the air temperature $\alpha$ which indicates the hydraulic temperature as shown in FIG. 8.

Step 1: Turn on the control circuit.

Step 2: Compute the difference between the air temperature $\alpha$ and the preset temperature $\alpha 1$ stored in the memory 5E. If the result of computation $(\alpha - \alpha 1)$ is negative, a value ts which is negatively proportional to the air temperature as shown in the characteristic diagram of FIG. 8 is stored in the memory 5E as the basic application period tsp as described previously.

Step 3: Compute the deviation Er, $Er = p\theta o - p\theta$.

Step 4: Determine whether the absolute value of the deviation Er is smaller or larger than the absolute value of the minimum reference deviation Ero stored in the memory, and also determine the polarity of the deviation Er.

Step 5: If the absolute value of the deviation Er is larger than the absolute value of the minimum reference deviation Ero as determined in Step 4, and if the computation $(\alpha - \alpha 1)$ in Step 2 has resulted in negative, the basic application period tsp which has been obtained in Step 1 is used as the application period ts. The microcomputer 5 sends out a command signal having a period of ts over the line 5k1 (FIG. 3) or 5k2 depending on the polarity of the deviation Er.

Step 6: If the absolute value of the deviation Er is smaller than the absolute value of the minimum reference deviation Ero as determined in Step 4, the application period ts of the command signal is set to zero.

The series of computation from Step 1 to Step 6 are carried out once or specified number of times, then the normal computational sequences from computation 1 through 3 and computation 4-1 through 5 are carried out subsequently by use of the characteristic in FIG. 7. The number of times for computation may alternatively be defined as a specified time period, and in this case the final basic application period tsp obtained in the above computational steps and stored in the Step 2 is used for setting the sensitivity of control. As control proceeds for the specified number of times or specified period in consideration of the oil temperature, or while the sensitivity of control is adjusted as mentioned above, the oil temperature rises due to the operation or a temperature rise in the engine room, and the adaptive control will proceed.

It should be noted that the relation between the air temperature $\alpha$ and the application period ts of the command signal is approximated to a linear characteristic in FIG. 8. However, a logarithmic characteristic curve as shown in FIG. 9 may be used.

In the foregoing embodiment, the hydraulic oil temperature is not measured directly, but it is substituted by the air temperature. This is based on the fact that the oil temperature in the hydraulic control system is equal to the air temperature at the beginning of the operation. Consequently, the thermal sensor can be mounted on the computer 5 which is exposed to the air or on the printed circuit board within the enclosure of the computer, thereby avoiding a complex wiring which would otherwise be required in direct measurement of the hydraulic oil temperature.

However, when the hydraulic oil temperature is substituted by the air temperature as described in the above embodiment, the temperature will not show a significant rise when the actual oil temperature rises due to the operation or a temperature rise in the engine room.

In the above embodiment, control on the basis of the air temperature is carried out once or specified number of times at the beginning of the control, and it is followed by the foregoing normal control with the following consideration being taken.

After the normal control has started, the sensitivity of control is often still dull due to a cold hydraulic oil. The sensitivity of control in the normal control directly affects the value of the deviation Er, and a dull sensitivity of control is liable to cause a large deviation Er. In the foregoing normal control, the sensitivity of control is adjusted in response to the magnitude of the deviation Er by the equations (6) and (7), and this means that the effect of the hydraulic oil temperature to the sensitivity of control is compensated even after the normal control has started.

What is important here is that the sensitivity of control is related to the deviation Er after the normal control has started as mentioned above, whereas the deviation Er immediately after control has been initiated has no relation with the sensitivity of control.

This is due to an indeterminate deviation at the beginning of the control caused by the negative feedback control system as mentioned previously, and a large deviation Er at the beginning does not always means a dull sensitivity of control.

Thus, according to the present invention, the basic application period tsp of the pulse signal for use in the initial state is determined in accordance with the thermal factor of the hydraulic oil which is most effective to the sensitivity of control at the beginning of the control.

It is therefore obvious from the above reason that detection of the air temperature in the foregoing embodiment may be replaced with detection of the hydraulic oil temperature for correcting the sensitivity of control at the beginning of the control. In this case, the sensitivity of control may be adjusted continuously until the oil temperature has reached the normal temperature in response to the hydraulic oil temperature which is detected directly.

The following describes another embodiment of the invention, wherein the hydraulic oil temperature is detected directly instead of measuring the air temperature for carrying out the correction of the sensitivity of the control system and the computation prior to the normal control.

In the following description on control based on the direct measurement of the oil temperature, the horizontal axis $\alpha$ in FIG. 8 is assumed to represent the hydraulic oil temperature.

Step 1: Turn on the control circuit.

Step 2: Compute the difference between the hydraulic oil temperature $\alpha$ in the hydraulic pump 3 and the preset oil temperature $\alpha 1$ stored in the memory 5E.

Step 3: Compute the deviation Er, $Er = p\theta o - p\theta$.

Step 4: Determine whether the absolute value of the deviation Er is smaller or larger than the absolute value of the minimum reference deviation Ero stored in the memory.

Step 5: If the absolute value of the deviation Er is larger than the absolute value of the minimum reference deviation Ero as determined in Step 4 and the computation ($\alpha - \alpha 1$) in Step 2 has resulted in negative, the microcomputer 5 sends out a command signal having a duration ts which is negatively proportional to the oil temperature a over the line $5k$ until the abosolute value of the deviation Er falls below the absolute value of the minimum reference deviation Ero.

By the effect of the command signal, the electromagnetic valve 5F in FIG. 1 operates in one direction, and consequently, the high pressure hydraulic oil supplied from the hydraulic pump 3 operates the hydraulic actuator within the injection timing regurator 2 in one direction so as to optimize the timing of fuel injection by the fuel injection pump 4.

While the foregoing operation proceeds, the oil temperature $\alpha$ rises due to its operation or a temperature rise in the engine room, and the foregoing normal control process will start when the oil temperature $\alpha$ becomes higher than the preset temperature $\alpha 2$.

When control of this embodiment is transferred to the normal control, the application period ts of the command signal which has been issued at the end of the control of the embodiment is used as the first basic application period tsp for the equations (6) and (7) in the normal control.

In the above embodiments by measurement of the air temperature and by measurement of the oil temperature, control is carried out so that the sensitivity of the control system is negatively proportional to the temperature. However, because of the closed loop configuration in accordance with the present invention, the deviation Er can possibly be very large initially when the control system has been turned on. If such condition is further added by an extremely low oil temperature, a special consideration must be taken so that the deviation is quickly restored to the neighborhood of the minimum reference deviation Ero.

The following embodiment is contemplated in such situation to control the initial state prior to the normal control. A series of computation will be described on the asumption that the hydraulic oil temperature $\alpha$ is directly measured.

Step 1: Turn on the control circuit.
Step 2: Compute the difference between the oil temperature $\alpha$ in the hydraulic pump 3 and the preset oil temperature $\alpha a$ stored in the memory 5E.
Step 3: Compute the deviation Er, $Er = p\theta o - p\theta$.
Step 4: Determine whether the absolute value of the deviation Er is smaller or larger than the absolute value of the minimum reference deviation Ero stored in the memory.
Step 5: If the absolute value of the deviation Er is larger than the absolute value of the minimum reference deviation Ero as determined in Step 4 and if the computation ($\alpha - \alpha a$) in Step 2 has resulted in negative, the microcomputer 5 sends out the active control signal continuously over the line $5k$ until the absolute value of the deviation Er falls below the absolute value of the minimum reference deviation Ero.

By the effect of the control signal, the electromagnetic valve 5F in FIG. 1 operates in one direction, and consequently, high pressure oil supplied from the hydraulic pump 3 operates the hydraulic actuator within the injection timing regulator 2 in one direction continuously. The operation by this continuous signal will last until the timing of fuel injection by the fuel injection pump 4 is corrected to the first appropriate value.

On completion of the first period from Step 1 to Step 5, when the setting of the load is maintained appropriately or if the deviation Er goes slightly out of the range of the minimum reference deviation Ero due to a variation of condition against the load and at the same time the oil temperature in the hydraulic control system is still lower than the specified level, the following second period of control will proceed.

Step 6: Determine the polarity of the difference ($\alpha - \alpha b$) between the oil temperature $\alpha$ in the hydraulic pump 3 and the preset temperature $\alpha b$ stored in the memory 5E.
Step 7: Carry out the determination of Step 4.
Step 8: If the absolute value of the deviation Er is larger than the absolute value of the minimum reference deviation Ero as determined in Step 7 and the polarity of computation ($\alpha - \alpha b$) shows negative, an offset control signal having a polarity corresponding to the polarity of the deviation Er is sent out over the line $5k$, with the duration of the offset control signal including a component which is negatively proportional to the hydraulic oil temperature $\alpha$.

While the foregoing operation proceeds, when the oil temperature $\alpha$ rises due to its operation or a temperature rise in the engine room and becomes higher than the preset temperature $\alpha b$ in Step 6, the foregoing normal control in the third period will start.

In the transition from the control of this embodiment to the normal control, the application period ts of the command signal which has been issued at the end of the control of this embodiment is used as the initial application period tsp for the equations (6) and (7) in the normal control as in the case of the previous embodiment.

As can be seen from the above description, whereas the conventional digital control issues short command pulses repetitively to minimize the deviation Er while the oil temperature is low, the method of controlling a hydraulic actuator according to the present invention uses the command signal with its application period being increased longer than the predetermined width as the temperature of hydraulic oil used in the hydraulic control system falls, thereby increasing the total ON-time of the command signal for a cold hydraulic oil. Consequently, the deterioration of response of the hydraulic control system due to a fall in the oil temperature is compensated by reducing the halt time of the oil supply to the hydraulic actuator.

Particularly, in the method of controlling a hydraulic actuator according to the present invention by employment of the indirect measurement of the oil temperature which is carried out by measuring the air temperature, the thermal sensor can be mounted directly on the microcomputer 5, thereby avoiding the complicateness of detecting the oil temperature in the reservoir and leading the detection signal to the computer, and also reducing the possibility of malfunctioning in such complex circuitry.

Moreover, in the method of controlling a hydraulic actuator according to the present invention by employment of the direct measurement of the hydraulic oil temperature, the response of control can be maintained substantially constant due to the characteristic of the command signal application period ts as shown in FIG. 8 or FIG. 9, even during a change of the oil temperature in the hydraulic control system due to its operation.

Accordingly, the method of controlling a hydraulic actuator according to the present invention does not need an expensive, bulky and energy-consuming oil temperature controller, and does not spend useless time for warming up the hydraulic oil before the initiation of control.

Furthermore, in the method of controlling a hydraulic actuator according to the present invention by employment of the arrangement in which when the oil temperature is very low, the first pulse signal after the control system has been turned on is kept active until the deviation Er decreases to the specified range with the succeeding output pulse signal having a duration which includes a component negatively proportional to the oil temperature, a hunting due to overshooting does not occur in the control system even if the first pulse is kept outputted until the deviation falls to the specified range as a result of a lowered sensitivity of control of the control system caused by a very low oil temperature when the first pulse is applied. The operation of bringing the deviation Er which has been indeterminate initially to the neighborhood of zero level and the subsequent operation for setting the application period of the signal in negatively proportion to the oil temperature make it possible a quick and appropriate control after the hydraulic control system has been turned on.

When the method of controlling a hydraulic actuator in accordance with the present invention is applied to the fuel injection timing regulator 2 for the engine, the exhaust gas composition during the warm-up period in winter will be made satisfactory, and the fuel consumption of the engine will be made appropriate.

What is claimed is:

1. A method of controlling a hydraulic actuator wherein the deviation between a controlled resultant value and a reference command signal is minimized by the application of a digital pulse signal to said actuator, comprising the steps of:

detecting an initial temperature substantially corresponding to the temperature of the hydraulic oil used in a hydraulic control;

comparing said initial temperature with a predetermined temperature;

storing a period ts which is negatively proportional to said initial temperature in a memory as a pulse width t of said digital pulse signal, when said initial temperature is lower than said predetermined temperature;

storing a predetermined basic period tso in said memory as a pulse width t of said digital pulse signal, when said initial temperature is highter than or equal to said predetermined temperature;

initially detecting an actual condition factor Pe of said actuator and comparing said actual condition factor Pe with a command condition factor P$\theta$o to determine a deviation Er between said factors;

comparing the absolute value of the deviation Er with a predetermined minimum deviation value Ero;

outputting a digital pulse signal having a pulse width t to said actuator, when said absolute value of the deviation Er is greater than said predetermined minimum deviation value Ero;

again detecting the actual condition factor P$\theta$ of said actuator and comparing said actual condition factor P$\theta$ with a command condition factor P$\theta$o to obtain a deviation Er between said factors;

comparing the absolute value of the deviation Er with said predetermined minimum deviation value Ero;

comparing said absolute value of the deviation Er with a predetermined maximum deviation value Er$_1$, when said absolute value of said deviation Er is greater than said predetermined minimum deviation value Ero;

continuously outputting said digital pulse signal to said actuator, when and so long as said absolute value of the deviation Er is greater than said predetermined maximum deviation value Er$_1$, detecting the actual condition factor to determine the deviation Er between said actual condition factor P$\theta$ and said command condition factor P$\theta$o, and comparing the thus obtained deviation Er with said predetermined maximum deviation value Er$_1$;

adding a period proportional to said absolute value of the deviation to said predetermined basic period tso so as to obtain a pulse width t of said digital pulse signal, when said absolute value of said eviation Er is less than said predetermined maximum deviation Er$_1$; and outputting said digital pulse signal having a pulse width t to said actuator.

2. A method of controlling a hydraulic actuator according to claim 1, wherein said temperature corresponding to the temperature of the hydraulic oil is the air temperature on the periphery of a computer.

3. A method of controlling a hydraulic actuator according to claim 2, wherein said detection of the air temperature on the periphery of said computer is detected by a temperature sensor fixedly mounted on the exterior wall of an enclosure of said computer.

4. A method of controlling a hydraulic actuator according to claim 2, wherein said detection of the air temperature on the periphery of said computer is detected by a temperature sensor fixedly mounted on a printed circuit board within the enclosure of said computer, so that the temperature detected by said sensor is assumed to be said air temperature.

5. A method of controlling a hydraulic actuator according to claim 1, wherein said temperature corresponding to the hydraulic oil temperature is the temperature of the hydraulic oil itself in the hydraulic control system.

6. A method of controlling a hydraulic actuator according to claim 1, wherein said hydraulic control system is arranged such that an injection timing regulator of a fuel injection pump for an engine is operated by a hydraulic actuator, said hydraulic actuator being operated by an electromagnetic valve which is operated by a digital pulse signal supplied from said computer.

* * * * *